United States Patent
Yeung

(10) Patent No.: US 11,828,610 B2
(45) Date of Patent: *Nov. 28, 2023

(54) ROADWAY INFORMATION DETECTION SENSOR DEVICE/SYSTEM FOR AUTONOMOUS VEHICLES

(71) Applicant: Peter Yeung, Ottawa (CA)

(72) Inventor: Peter Yeung, Ottawa (CA)

( * ) Notice: Subject to any disclaimer, the term of this patent is extended or adjusted under 35 U.S.C. 154(b) by 74 days.

This patent is subject to a terminal disclaimer.

(21) Appl. No.: 17/553,660

(22) Filed: Dec. 16, 2021

(65) Prior Publication Data

US 2022/0107197 A1 Apr. 7, 2022

Related U.S. Application Data

(63) Continuation of application No. 15/784,168, filed on Oct. 15, 2017, now Pat. No. 11,237,011.

(30) Foreign Application Priority Data

Oct. 18, 2016 (CA) ...................... 2945564

(51) Int. Cl.
G05D 1/02 (2020.01)
G01C 21/34 (2006.01)
G01C 21/00 (2006.01)

(52) U.S. Cl.
CPC ..... *G01C 21/3492* (2013.01); *G01C 21/3815* (2020.08); *G01C 21/3837* (2020.08); *G05D 1/0217* (2013.01); *G05D 1/0244* (2013.01); *G05D 1/0236* (2013.01); *G05D 1/0242* (2013.01); *G05D 1/0255* (2013.01); *G05D 1/0257* (2013.01); *G05D 2201/0213* (2013.01)

(58) Field of Classification Search
CPC .. G05D 1/0234; G05D 1/0236; G05D 1/0217; G05D 1/0242; G05D 1/0244; G05D 1/0255; G05D 1/0257; G05D 2201/0213; G01C 21/3492; G01C 21/3815; G01C 21/3837
USPC ........................................................... 701/26
See application file for complete search history.

(56) References Cited

U.S. PATENT DOCUMENTS

| | | | |
|---|---|---|---|
| 4,847,773 A | 7/1989 | Van Helsingen et al. | |
| 4,974,259 A | 11/1990 | Takahashi et al. | |
| 5,390,118 A | 2/1995 | Margolis et al. | |
| 5,790,403 A | 8/1998 | Nakayama | |
| 5,913,376 A | 6/1999 | Takei | |
| 5,957,983 A | 9/1999 | Tominga | |
| 6,194,486 B1 | 2/2001 | Yuriji et al. | |
| 6,215,392 B1 | 4/2001 | Okada | |
| 6,226,592 B1 | 5/2001 | Luckscheiter et al. | |
| 6,336,064 B1 | 1/2002 | Honkura et al. | |
| 6,414,606 B1 | 7/2002 | Yujiri et al. | |
| 6,934,613 B2 | 8/2005 | Yun | |
| 7,140,803 B2 * | 11/2006 | Cummings | E01F 9/30 404/94 |
| 7,610,146 B2 | 10/2009 | Breed | |

(Continued)

*Primary Examiner* — Joshua E Rodden

(57) ABSTRACT

A system for an autonomous vehicle by providing lane markers on the road for which a vehicle will read and navigate the road. The vehicle transmits a discovery signal and is returned from the marker to indicate the position on the road and how to proceed on the road. The system uses either an autonomous control system or 3D map navigation database to determine the direction of the vehicle in real time.

15 Claims, 4 Drawing Sheets

(56) References Cited

U.S. PATENT DOCUMENTS

| | | |
|---|---|---|
| 8,433,467 B2 | 4/2013 | Ross-Martin |
| 9,080,866 B1 | 7/2015 | Dowdall et al. |
| 9,163,368 B2 | 10/2015 | Asgari |
| 9,261,881 B1 * | 2/2016 | Ferguson ............... G01S 17/931 |
| 9,383,753 B1 | 7/2016 | Templeton et al. |
| 9,701,846 B2 * | 7/2017 | Protzmann ............... E01F 9/524 |
| 9,892,296 B2 | 2/2018 | Kovarik et al. |
| 10,127,461 B2 | 11/2018 | Pratt et al. |
| 10,127,462 B1 | 11/2018 | Pratt et al. |
| 11,591,020 B1 * | 2/2023 | Nickel ..................... G08G 1/02 |
| 2007/0194248 A1 * | 8/2007 | Belov ....................... G01J 1/58 |
| | | 250/458.1 |
| 2008/0040029 A1 | 2/2008 | Breed |
| 2008/0228400 A1 | 9/2008 | Wheeler |
| 2012/0070227 A1 | 3/2012 | Asgari |
| 2012/0098657 A1 | 4/2012 | Bogatine |
| 2015/0142251 A1 | 5/2015 | Aldereguia et al. |
| 2015/0303581 A1 * | 10/2015 | Bodo ..................... G01S 13/426 |
| | | 342/7 |
| 2016/0132705 A1 | 5/2016 | Kovarik et al. |
| 2017/0284812 A1 * | 10/2017 | Kim ................... G01C 21/3867 |
| 2018/0004213 A1 | 1/2018 | Absmeier et al. |
| 2018/0022347 A1 | 1/2018 | Myers et al. |
| 2018/0335781 A1 | 11/2018 | Chase et al. |
| 2019/0072076 A1 | 3/2019 | Bell et al. |
| 2019/0079530 A1 | 3/2019 | Steder et al. |
| 2019/0130743 A1 | 5/2019 | Dabby et al. |
| 2019/0132709 A1 | 5/2019 | Graefe et al. |
| 2019/0367012 A1 | 12/2019 | Matta et al. |
| 2020/0233425 A1 | 7/2020 | Takakashi |
| 2021/0166052 A1 | 6/2021 | Park et al. |

* cited by examiner

ROADWAY INFORMATION DETECTION SENSOR DEVICE/SYSTEM FOR AUTONOMOUS VEHICLES

CROSS-REFERENCE TO RELATED APPLICATIONS

This application claims the benefit of priority from U.S. patent application Ser. No. 15/784,168 filed Oct. 15, 2017 which has issued as U.S. Pat. No. 11,237,011; which itself claims the benefit of priority from Canadian Patent Application 2,945,564 filed Oct. 18, 2016.

FIELD OF THE INVENTION

The present invention relates to the guidance of autonomous vehicles and in particular, relates to guiding an autonomous vehicle along a roadway by means of passive lane markers during normal and inclement weather and various luminous conditions.

BACKGROUND OF THE INVENTION

The proposed sensor devices are strategically placed in or on the vehicle that will detect "special" lane markers. The lane markers can consist of any of the following: reflective paints, metal paints, small sensors that light up (when the vehicle is about to approach the markers) whose power is from solar, battery, or by the vehicle itself sending microwave energy to activate these lane markers.

Currently autonomous vehicles are helpless without a system of navigation. In use today, the navigation system is either GPS based for obtaining details of the roads or LIDAR-based (Light Detection and Ranging) for mapping of the road networks. This pre-mapping of the road is inefficient and, in most cases, impractical if there are continual changes to the vehicles on the road if they do not have the latest updates or changes of the road networks. This could potentially result in a catastrophe. Even if feasible, the amount of changes will require a multitude of road networks to be re-mapped. This will not give the autonomous vehicles the information it needs to navigate the roadway in a timely manner.

Furthermore, current technologies such as optical systems, LIDAR, and other roadway interpretation systems fail under severe weather conditions and under certain luminous conditions. As such, the present invention claims will help evolve the self-driving, autonomous vehicles to navigate the road in a more effective manner under normal or severe weather conditions and any luminous conditions.

Based on the preliminary research of the current technologies that is deployed or proposed to solve the navigation for the autonomous vehicles on our roads today, all fail to navigate under inclement weather conditions and are costly to implement. However, the present invention below represents a more economical and efficient way to implement a self-assisted navigation system. For example, one of the claims is to modify the existing lane marking painting technique using ferrous or non-ferrous materials so that sensors on the autonomous vehicle can accurately pick up or sense the location of the marker(s) on the road—especially under inclement weather conditions.

As an example, in U.S. Pat. No. 9,080,866 B1 patent it claims that it's using a laser detection system to pick up reflections from the lane marker reflective property. Under inclement weather this system will fail as snow, ice, fog, or rain will cause havoc with a laser based detection system. The laser will not be able to penetrate heavy snow and may get a false reflection signal from bouncing off the snow.

In another example from patent US 2015/0303581A1, a reflector which contains both microwave retro-reflector and an embedded tuned circuit is claimed. This type of system tends to be expensive to implement as it requires installing active circuitry devices along the many miles of the road as lane markers. And not to mention these active devices could become malfunction or die altogether over time.

SUMMARY OF THE INVENTION

This disclosure relates to an autonomous vehicle and a system from controlling the same. More specifically, the present disclosure is directed towards autonomous vehicles with a plurality of sensor devices to read road information to navigate along the roadway.

It is the objective of the present disclosure to provide an improved autonomous vehicle and a system of sensor devices for detecting the road information from passive lane markers which can be read when in severe weather conditions and/or luminous conditions.

According to an aspect of the disclosure it is to provide an autonomous vehicle, comprising: a system of sensor devices strategically placed on an autonomous vehicle to read road information
  whereby this information is then processed by a hub, then passed onto either an autonomous control system and/or 3D map navigation database system to decide on how to navigate the road safely in a real-time manner, the system comprises of:
  the hub includes processing and storage capability;
  sensor devices on the vehicle consisting of components that will transmit a discovery signal, and from which lane markers on the roadway can be discovered through signal processing of the reflected signals; wherein
  the hub, once the roadway information is processed it is then communicated back to the autonomous control system and/or 3D map navigation database system where a roadway path is formulated for navigation; and
  wherein road information is captured and mapped in real-time for use and updated to the network.

In another aspect of the disclosure it is to provide an autonomous vehicle comprising:
  a non-transitory computer readable storage medium storing instructions for controlling a system of sensor devices strategically placed on an autonomous vehicle to read road information whereby this information is then processed by a hub, then passed onto either an autonomous control system and/or 3D map navigation database system to decide on how to navigate the road safely in a real-time manner, the system comprises of:
  the hub includes processing and storage capability;
  sensor devices consisting of components that will transmit a discovery signal, where the discovery signal will be transmitted from the vehicle where lane markers on the roadway can be discovered through signal processing of the reflected signals;
  wherein the hub, once the roadway information is processed it is then communicated back to the autonomous control system and/or 3D map navigation database system where a roadway path is formulated for navigation; and
  wherein road information is captured and mapped in real-time for use and updated to the network.

In another aspect of the disclosure it is to provide an autonomous vehicle comprising:

a method for sensor devices strategically placed on an autonomous vehicle to read road information whereby this information is then processed by a hub and then passed onto either an autonomous control system and/or 3D map navigation database system to decide on how to navigate the road safely in a real-time manner, the method comprises of:

providing the hub with processing and storage capability;

including sensor devices consisting of components that will transmit a discovery signal, where the discovery signal will be transmitted from the vehicle where lane markers on the roadway can be discovered through signal processing of the reflected signals;

processing roadway information in the hub which is then communicated back to the autonomous control system and/or 3D map navigation database system, where a roadway path is formulated for navigation; and capturing and mapping road information in real-time for use and updated to the network.

Additional objects, features and advantages of the present invention will become more readily apparent from the following embodiments when taken in conjunction with the drawings wherein the reference numerals refer to the corresponding parts in the several views.

DESCRIPTION OF DRAWINGS

The description herein makes reference to the accompanying drawings below wherein like reference numerals refer to like parts throughout the several views, and wherein:

FIG. 2 illustrates how the sensors not only require to detect the lane markers immediately adjacent to the vehicle, but they also need to detect the lane markers that are either one or multiple lane(s) over from the current lane that the vehicle is on.

DETAILED DESCRIPTION

Figure 1:
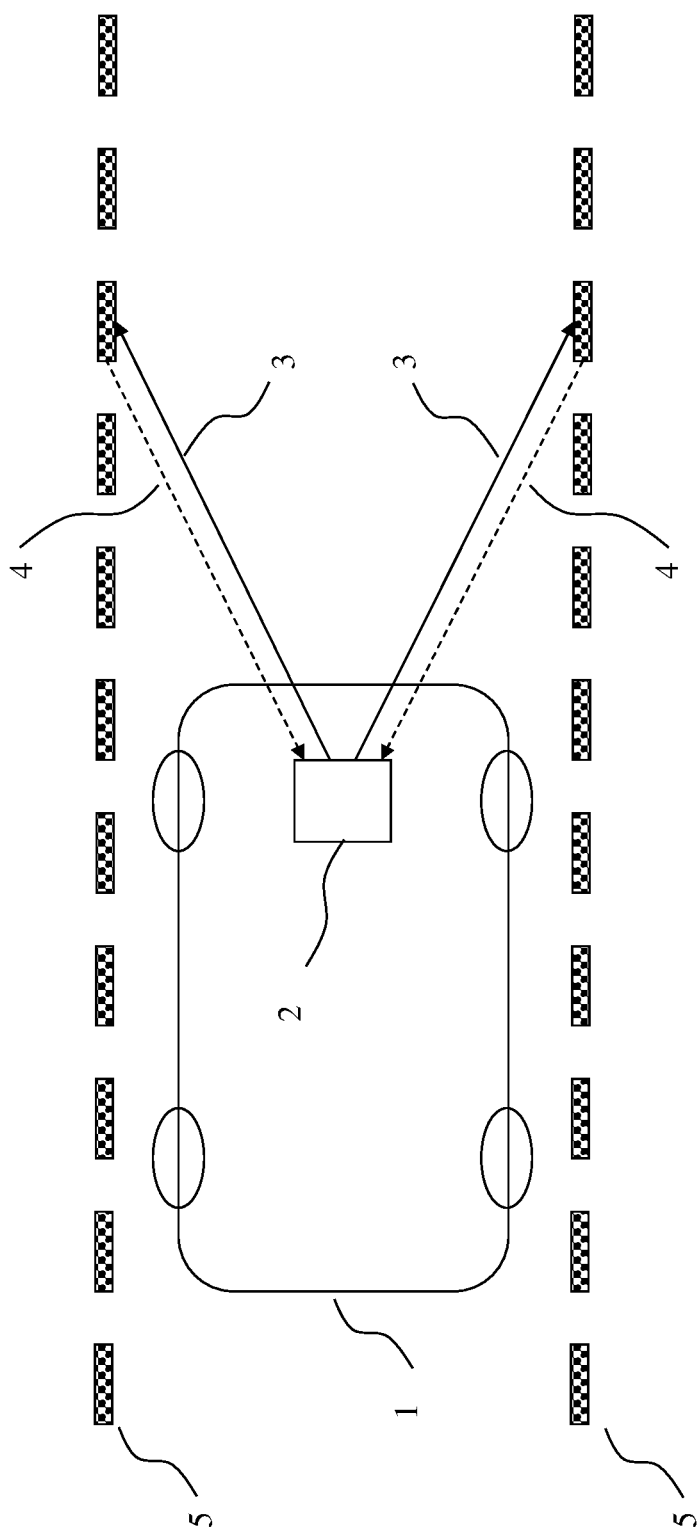
FIG. 1 is a block diagram of the sensor strategically mounted on the vehicle (in this case at the front) pointing down towards the road. Also shown is the RF transmitted wave impinging on the lane markers (installed along the roadway) and being reflected back towards the sensor antenna. This reflected signal is used by the central processing hub and autonomous control system for further processing and mapping of the roadway for navigation.

FIG. 1 demonstrates a scenario where the RF transmitted energy 3 from the vehicle rooftop sensor 2 is incident upon the lane marker(s) 5 and bounces back towards the sensor. The sensor can either be a complete unit system with an integrated sectorized antenna (a ruggedized design suitable for withstanding severe weather condition while strategically placed on the inside or outside of the vehicle), or it can simply be the sensor installed inside the vehicle 1 while a ruggedized, sectorized antenna (connected to the sensor via a RF cable) is strategically mounted on the vehicle exterior.

Based on the time of arrival and incident angle of the reflected signal 4, the distance between the vehicle and the lane marker(s) can be calculated. In order to have sufficient data points to formulate a mapping of the roadway, the transmitted signal 3 is required to be sent out frequently at multiple samples per second.

Note in order to cover the front, back, and sides of the vehicle, multiple sensors (and their associated antennas) will be required to be installed. The number of sensors required is dictated by the achievable data point resolution to accurately generate a 3-D map of the road. As such, the sensor antenna coverage beamwidth and gain (to resolve and coherently receive the reflected signal) performance will contribute to the number of sensors required.

Figure 2:
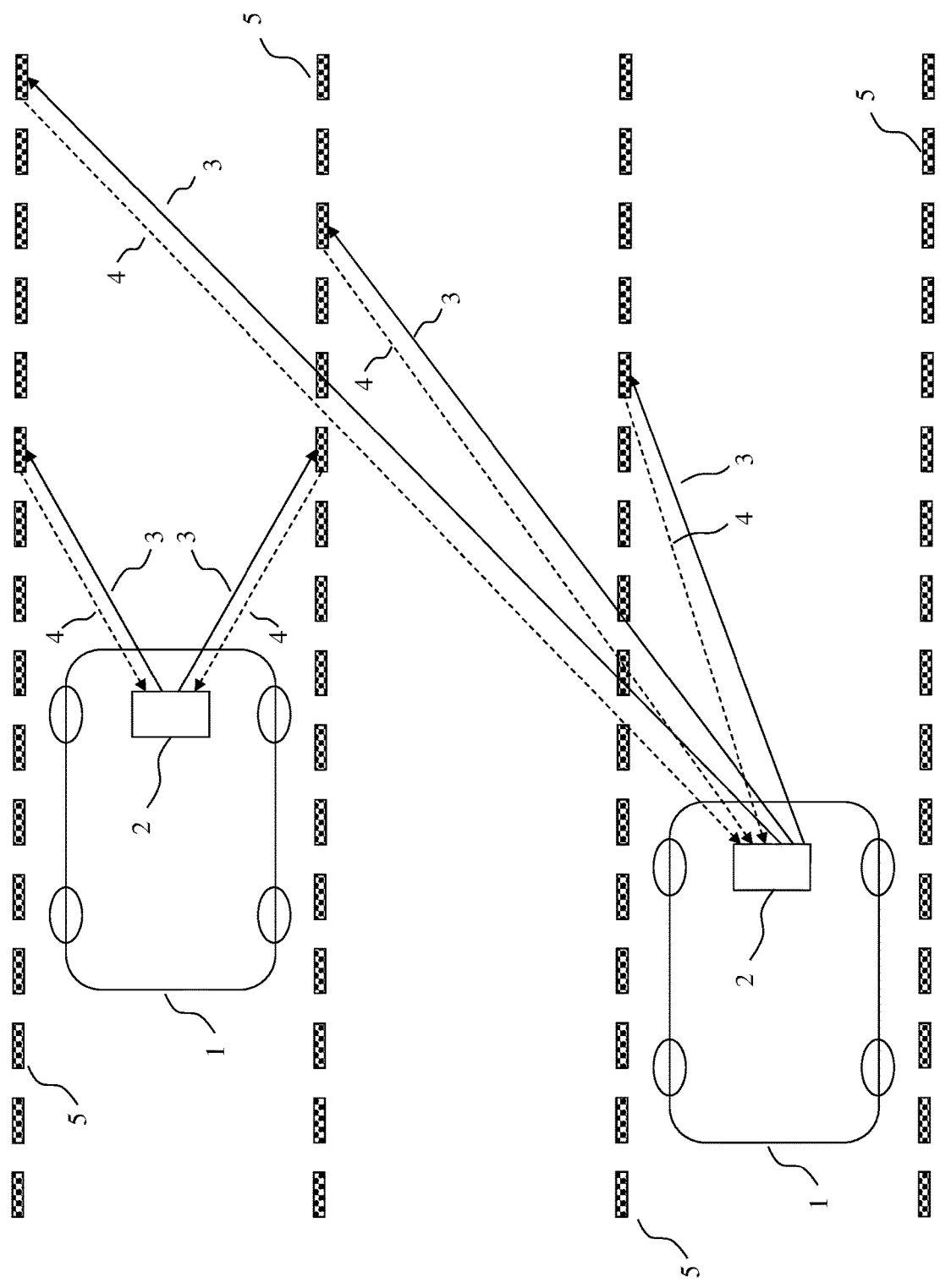

FIG. 2 illustrates how the sensors not only require to detect the lane markers immediately adjacent to the vehicle, but they also need to detect the lane markers that are one or multiple lane(s) over from the current lane that the vehicle is on. Although FIG. 2 only shows the one lane over to the left of the current lane (that the vehicle is on), the same scenario or concept applies to the lane over to the right of the current lane. And similar to FIG. 1, the front, back, and sides of the vehicle must be accounted for by the sensors. This is necessary for making proper lane changes.

Figure 3:
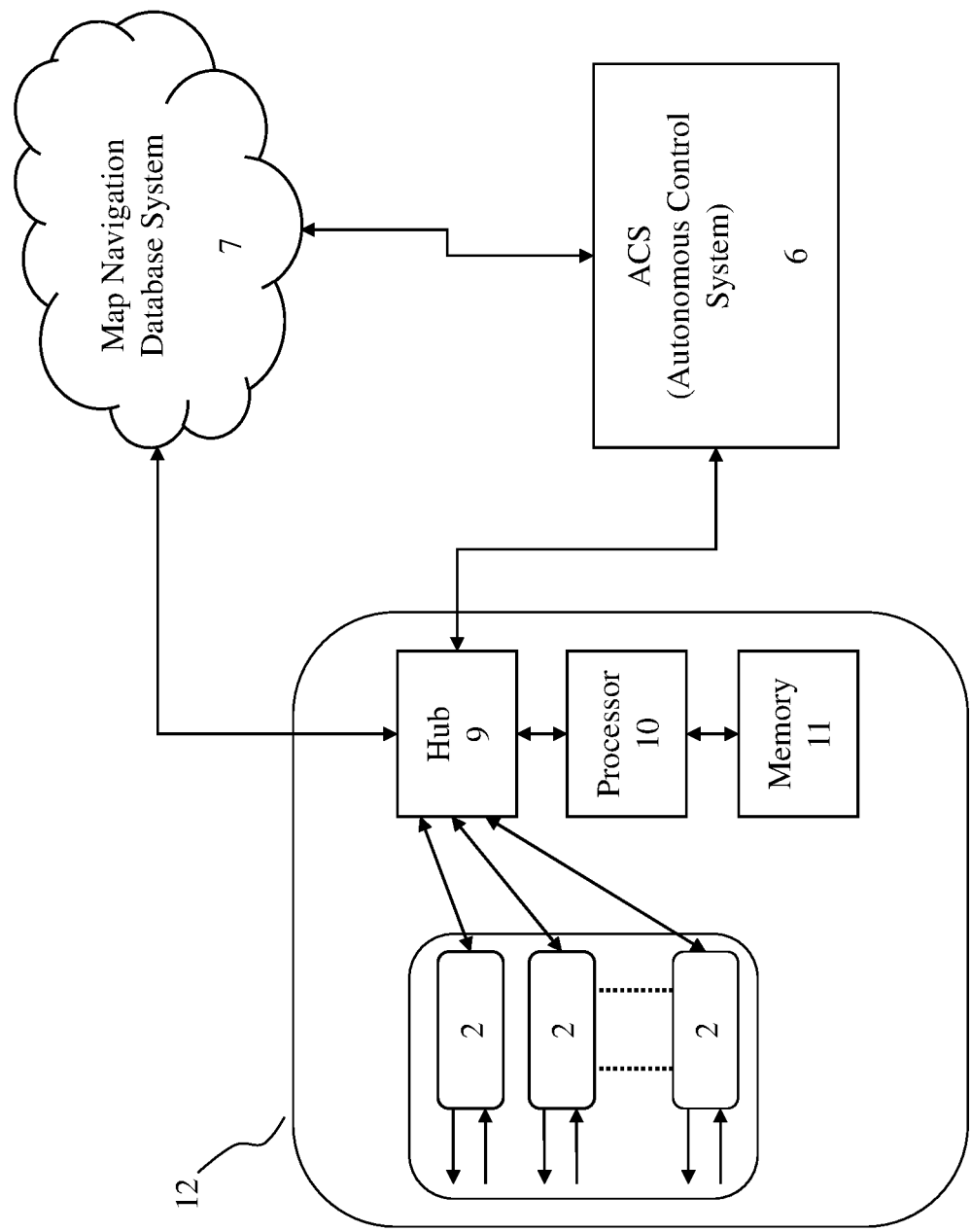
FIG. 3 is a block diagram illustrating the systems embodiment of the invention.

The circle 12 in FIG. 3 is the embodiment of the invention. In the circle, we have the sensors 8, hub 9, processor 10 and memory 11 where the roadway information is acquired, identified and processed. Once the information is processed and the information parsed and identified then it is sent to the Autonomous Control System (ACS) 6 and/or the 3D map navigation database system 7. Below briefly explains the function of each entity and how each interacts with one another.

The sensor sends out the discovery signal from the autonomous vehicle to discover the lane marker(s) as explained in FIG. 1 above.

All the received data from the sensors are processed by the hub. The main goal of the system is to identify the lane markers. After the lane markers are identified and processed, this information is passed to the Autonomous Control System and/or the 3D map navigation system. This has to happen in real time and in advance of the path the vehicle is traveling on.

The 3D map navigation database system, where the road networks are detailed and created into three dimensional so that the autonomous vehicle can use to traverse to its destination. In the scenario where the autonomous vehicle relies on using the 3D detailed mapping database system to obtain the lane information as it is traveling, then the proposed system in the circle 12 will compare the lane marking information on the 3D map to see if it is up to date with the newly acquired information. In the event the lane markers are out of date, the system thus flags the changes for the 3D mapping system to make the updated changes.

In a scenario where the autonomous vehicle is acquiring the road information in real time, the identified lane marker information is passed directly to the Autonomous Control System (ACS) for use in navigating the roadway. Once the autonomous vehicle has successfully navigated the roadway, then this information is passed to the 3D mapping system to compare and update lanes marking information for future use via locally stored or, via other 3D mapping system on the network.

Figure 4:
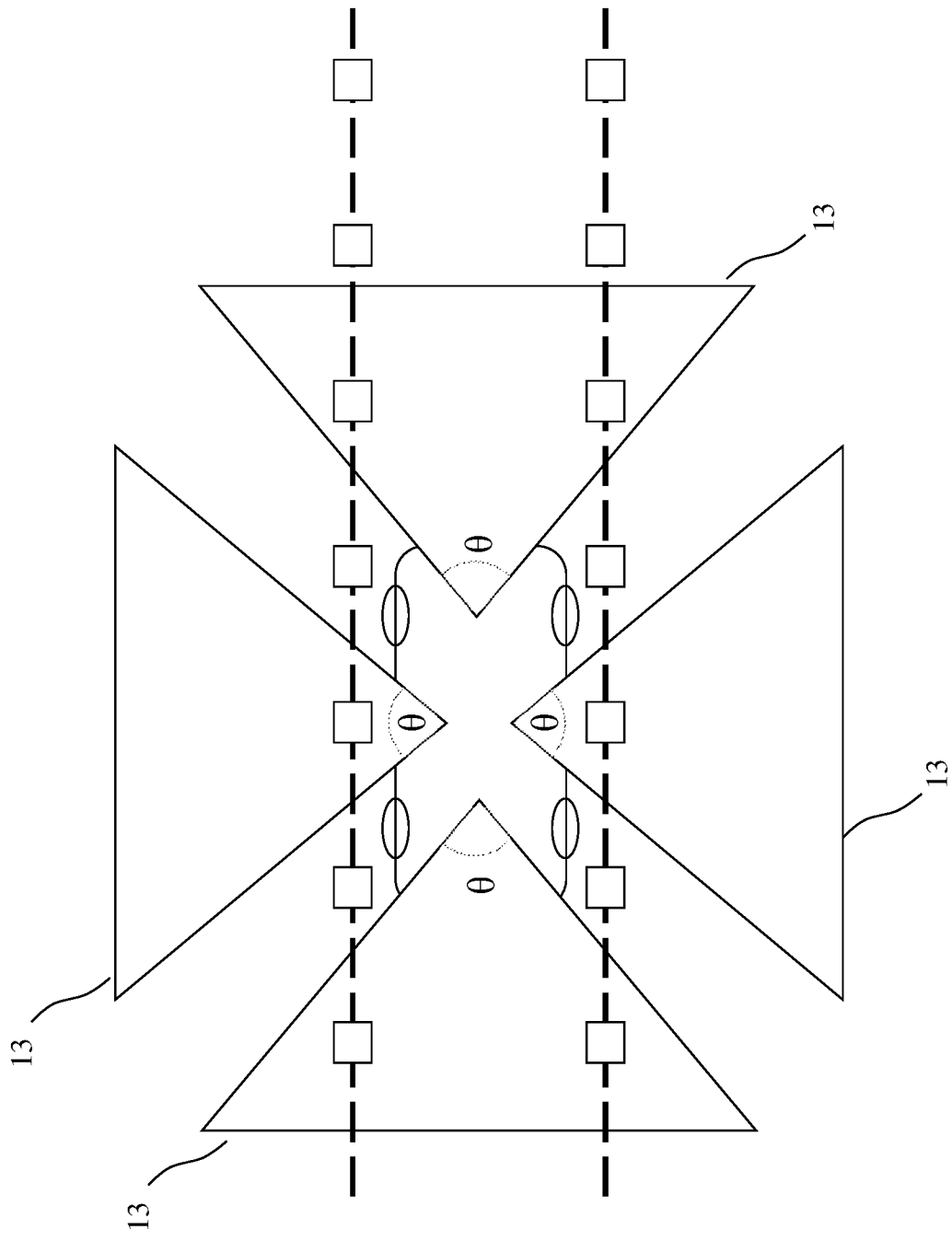
FIG. 4 is a block diagram showing 4 antennas strategically placed on the vehicle to cover all 4 sides of the vehicle while pointing down towards the road—the diagram illustrates along a straight road. Each antenna will have a certain beamwidth θ (in degrees) to encompass the side of the vehicle it is intended for and to ensure sufficient coverage overlap to pick up most of the lane markers for proper & accurate mapping of the roadway.

FIG. 4 shows the coverage angle of each transmitted beam from the autonomous vehicle to the lane markers for all sides 13. The reflected signal from the passive lane markers is processed, and from this the relative distance of each lane marker to the vehicle is determined. The sensors send out discovery signals to find out the lane markers from all sides of the vehicle to indicate that the vehicle is within the corresponding lane markers. As the lane markers are learnt then adjustments are made through the autonomous control system and may involve reducing the speed of the vehicle.

In the event the vehicle is required to go in the reverse direction it would have all the needed information to complete its task.

As all the lane markers are learnt from all sides of the vehicle, this information can be stored in a 3D map navigation database, or the autonomous control system depending on which database is being used. Further, with the mapping the vehicle can update the mapping process for other vehicles in real time if there have been changes to the road due to construction or other such adjustments.

Based on the above, in the referred embodiment depicted, the system will work even under severe adverse weather conditions. The active sensor devices in the autonomous vehicle continue to read the lane and roadway information at certain frequency interval in real-time. The sensor devices in the autonomous vehicle can function independently as a stand-alone system or in conjunction with other existing navigation system (such as the GPS or Lidar system for example) to give it finer details of the roadway that it is travelling on. The proposed system is superior to other existing systems because, unlike other existing systems, this system will continue to work autonomously even under severe weather conditions such as heavy snowstorm, ice, fog or any other inclement weather.

It is important for the autonomous vehicle to have the latest road network details to navigate. These sensor devices can be strategically placed in, or mounted on, the vehicle to enable them to read the most accurate road information for either a straight or bent road.

Note that the proposed system does not require modification to the existing road networks, with the exception of changing the paint based material used for painting the lane lines/markers. As well, the lane markers could also be made of metallic lane markers. Thus, to summarize, the following is a sequence of steps that must happen for the autonomous vehicle to navigate the roadway in the most effective manner:

1. The sensor devices would send a discovery signal ahead using sonar technology for example.

2. The metallic paints or metallic lane markers bounces the discovered information back to the source.

3. The sensor device in the vehicle receives the discovered information signal (bounced off the lane markers) and passes it on to the processing hub.

4. The hub interprets/processes the information as it receives it in real time.

5. The processed information is translated to a format that is consumable by the autonomous control system or 3D map navigation database system.

6. The autonomous control system or 3D map navigation database system processes the information and makes decision based on the received discovered signals from the proposed sensor devices.

In order to have the most effective and accurate road information, the sensors would read the information from ahead and from both sides of the vehicle to determine the lane structures. Each side of the road may provide different information as the vehicle travels ahead. Once the information is obtained by the autonomous control system and/or 3D map navigation database system, it then processes it and formulates a decision on how to best navigate. The proposed system will work under any weather condition.

Although described with reference to referred embodiments of the invention, it should be readily understood that various changes and/or modifications can be made to the invention without departing from the spirit thereof. In general, the invention is only intended to be limited by the scope of the following claims.

Thus, the following outlines a set of claims that will help or evolve the self-driving, autonomous vehicles to navigate the road in a more effective manner under normal or sever weather and luminous condition.

What is claimed is:

1. A method comprising:
providing a radio frequency (RF) module forming part of an autonomous vehicle comprising one or more RF transmitters and one or more RF receivers; wherein
the one or more RF transmitters transmit radio frequency (RF) signals from the autonomous vehicle; and
the one or more RF receivers received reflected RF signals, the reflected RF signals being reflected from a plurality of passive markers disposed with respect to a surface being traversed by the autonomous vehicle, each passive marker of the plurality of passive markers being in a predetermined spatial relationship to a remainder of the plurality of passive markers; and
providing a hub forming part of the autonomous vehicle which executes a process comprising:
processing the reflected RF signals received from the plurality of passive markers to establish lane information, the established lane information comprising relative distances of each passive marker of the plurality of markers from the autonomous vehicle; and
determining in dependence upon the processed reflected RF signals received from the plurality of markers a position of the autonomous vehicle relative to the plurality of markers; wherein
processing the reflected RF signals received from the plurality of passive markers to establish lane information comprises processing a time of arrival and an incident angle of the reflected RF signal.

2. The method according to claim 1, wherein
the plurality of passive markers define a lane within which the autonomous vehicle travels.

3. The method according to claim 1, wherein
one of:
each passive marker of the plurality of passive markers comprises one or more metallic elements; and
each passive marker of the plurality of passive markers comprises metallic paint.

4. The method according to claim 1, wherein
each passive marker of the plurality of passive markers comprises a paint based material comprising metallic elements;
the metallic elements reflect the RF signals generated by the one or more RF transmitters; and
the paint based material allows a user of a non-autonomous vehicle to navigate the non-autonomous vehicle upon the surface.

5. The method according to claim 1, further comprising passing the established lane information to a control system of the autonomous vehicle; and either:

adjusting, with the control system, the autonomous vehicle in dependence upon the established lane information;

or:

adjusting, with the control system, the autonomous vehicle in dependence upon the established lane information where the adjustment is a reduction in speed of the autonomous vehicle.

6. The method according to claim 1, further comprising passing the established lane information to a control system of the autonomous vehicle;

adjusting, with the control system, the autonomous vehicle in dependence upon the established lane information; and one of:

storing the established lane information within a three-dimensional (3D) navigation database associated with the autonomous vehicle; and storing the established lane information within a remote three-dimensional (3D) navigation database accessible to a plurality of autonomous vehicles of which the autonomous vehicle is one.

7. The method according to claim 1, further comprising passing the established lane information to a control system of the autonomous vehicle;

adjusting, with the control system, the autonomous vehicle in dependence upon the established lane information;

passing the established lane information to a mapping system to determine whether the established lane information corresponds to lane information on a three-dimensional (3D) map associated with the surface on which the autonomous vehicle is travelling; and upon establishing a difference between the established lane information and the lane information on a three-dimensional (3D) map flagging the change for a 3D mapping system to update the 3D map; wherein the 3D mapping system is one of associated with the autonomous vehicle and remote from the autonomous vehicle.

8. The method according to claim 1, further comprising passing the established lane information to a control system of the autonomous vehicle;

adjusting, with the control system, the autonomous vehicle in dependence upon the established lane information;

passing the established lane information to a mapping process in execution upon a mapping system to determine whether the established lane information corresponds to lane information on a three-dimensional (3D) map associated with the surface on which the autonomous vehicle is travelling; and upon establishing a difference between the established lane information and the lane information on a three-dimensional (3D) map updating mapping processes of other autonomous vehicles.

9. The method according to claim 1, further comprising passing the established lane information to a control system of the autonomous vehicle;

adjusting, with the control system, the autonomous vehicle in dependence upon the established lane information; wherein the RF module and hub provide for control of the autonomous vehicle under a severe weather condition; and the severe weather condition is selected from the group comprising snow, a snowstorm, ice and fog.

10. A method comprising:

providing a hub forming part of an autonomous vehicle which executes a process comprising:

processing reflected radio frequency (RF) signals received from a plurality of passive markers to establish lane information, the established lane information comprising relative distances of each passive marker of the plurality of markers from the autonomous vehicle;

determining in dependence upon the processed reflected RF signals received from the plurality of markers a position of the autonomous vehicle relative to the plurality of markers;

passing the established lane information to a control system of the autonomous vehicle; and performing, with the control system, a lane change from a current lane to an adjacent lane;

wherein the plurality of passive markers comprises a first portion defining the current lane the autonomous vehicle is currently travelling within and a second portion defining the adjacent lane.

11. The method according to claim 10, wherein the reflected RF signals are provided to the hub by a RF module forming part of the autonomous vehicle comprising one or more RF transmitters and one or more RF receivers;

the one or more RF transmitters transmit RF signals from the autonomous vehicle; and the one or more RF receivers receive the reflected RF signals being reflected from the plurality of passive markers disposed with respect to a surface being traversed by the autonomous vehicle, each passive marker of the plurality of passive markers being in a predetermined spatial relationship to a remainder of the plurality of passive markers.

12. The method according to claim 10, wherein one of:

each passive marker of the plurality of passive markers comprises one or more metallic elements; and each passive marker of the plurality of passive markers comprises metallic paint.

13. The method according to claim 10, wherein each passive marker of the plurality of passive markers comprises a paint based material comprising metallic elements;

the metallic elements reflect the RF signals generated by the one or more RF transmitters; and the paint based material allows a user of a non-autonomous vehicle to navigate the non-autonomous vehicle upon the surface.

14. The method according to claim 10, further comprising either:

adjusting, with the control system, the autonomous vehicle in dependence upon the established lane information;

or:

adjusting, with the control system, the autonomous vehicle in dependence upon the established lane information where the adjustment is a reduction in speed of the autonomous vehicle.

15. A method comprising:

providing a radio frequency (RF) module forming part of an autonomous vehicle comprising one or more RF transmitters and one or more RF receivers; wherein the one or more RF transmitters transmit radio frequency (RF) signals from the autonomous vehicle; and the one or more RF receivers received reflected RF signals, the reflected RF signals being reflected from a plurality of passive markers disposed with respect to a surface being traversed by the autonomous vehicle, each passive marker of the plurality of passive markers being in a predetermined spatial relationship to a remainder of the plurality of passive markers; and providing a hub forming part of the autonomous vehicle which executes a process comprising:

processing the reflected RF signals received from the plurality of passive markers to establish lane information, the established lane information comprising relative distances of each passive marker of the plurality of markers from the autonomous vehicle; and determining in dependence upon the processed reflected RF signals received from the plurality of markers a position of the autonomous vehicle relative to the plurality of markers;

passing the established lane information to a control system of the autonomous vehicle; and performing, with the control system, a lane change from a current lane to an adjacent lane; wherein the plurality of passive markers comprises a first portion defining the current lane the autonomous vehicle is currently travelling within and a second portion defining the adjacent lane.

* * * * *